March 19, 1929.  G. REIME  1,705,682

ELECTRICAL MEASURING INSTRUMENT

Filed June 4, 1927

WITNESSES:
R. S. Williams
B. R. King

INVENTOR
Georg Reime
BY
Wesley G. Carr
ATTORNEY

Patented Mar. 19, 1929.

1,705,682

UNITED STATES PATENT OFFICE.

GEORG REIME, OF NUREMBERG, GERMANY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed June 4, 1927, Serial No. 196,425, and in Germany July 7, 1926.

My invention relates to electrical measuring instruments and more particularly to direct current ampere-hour meters.

An object of my invention is to provide means for employing steel magnets having a high coercive force in meters.

Another object of my invention is to provide means for reducing the size and weight of meters to a minimum.

A further object of my invention is to provide relatively simple adjustable mounting means for magnets.

These and other useful and desirable objects will be more fully explained in the accompanying description.

The size and weight of meters may be considerably reduced by the use of magnet steels, such as cobalt, having a high coercive force but such steels have a serious disadvantage in that they have a tendency to crack in the bending and drilling operations, thus rendering the manufacture of such steels for meters very expensive. Therefore, in order to reduce the cost of manufacture to a minimum, it is necessary that the shape of the magnets be as simple as possible.

In practicing my invention I provide novel mounting means so that an especially simple shape of hard steel magnet, for example cobalt steel may be used for meters such as direct current ampere-hour meters.

In accordance with my invention a plurality of bar magnets made of steel having a high coercive force are disposed on both sides of a disc armature. The bar magnets are mounted in a frame surrounding the armature in such manner that they are normally parallel to each other and parallel to the plane of the armature, but means are provided for adjusting the position of the bar magnets if it becomes necessary.

The ends of the bar magnets are disposed with poles of different polarity opposite each other. The magnetic lines of force leaving one pole, therefore traverse the disc and then enter the opposite pole.

In a modification of my invention the ends of the bar magnets are connected by a clamp to the frame, having a portion of the clamp next to the disc constructed of a magnetic material so that it constitutes the pole shoe of the magnet.

My invention may be better understood if the accompanying drawings are taken in connection with the following description.

Figure 1:
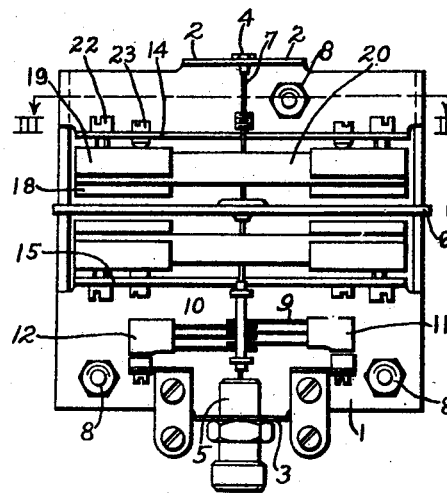
Figure 1 is a view in elevation of a portion of an ampere-hour meter constructed in accordance with my invention.
Figure 2:
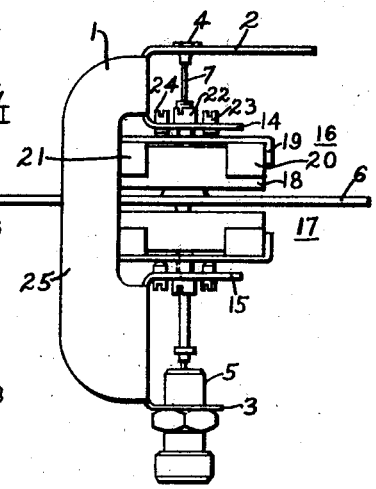
Fig. 2 is a view in side elevation of the meter shown in Fig. 1.

An ampere-hour meter constructed in accordance with my invention comprises, in general, a frame 1 having inwardly extending projections 2 and 3, adapted to support an upper bearing 4 and a lower bearing 5. An armature disc 6 mounted on a spindle 7 is adapted to rotate between the upper bearing 4 and the lower bearing 5. The frame 1 is mounted in the inner portion of a casing (not shown) by means of machine screws 8. Current is lead into, and out of, the armature circuit by means of brushes 9 and 10 mounted respectively on supporting members 11 and 12, that are in turn secured to the frame 1.

The frame 1 is provided with inwardly extending projections 14 and 15 on which are mounted clamps 16 and 17. The upper clamp 16 comprises a bottom clamping member 18 and a top clamping member 19. The bottom clamping member 18 is slotted to provide a recess for the ends of bar magnets 20 and 21. A screw 22 adjustably secures the bottom member 18 to the projection 14 of the frame 1. Two screws 23 and 24 are disposed in the projection member 14 on opposite sides of the screw 22. The screw 22 tends to pull the lower clamping member 18 upwardly and the screws 23 and 24 tend to push the top clamping member 19 downwardly so that the ends of the bar magnets 20 and 21 are held firmly between the top clamping member 19 and the bottom clamping member 18.

The lower clamping assembly 17 is constructed in a manner similar to the construction of the upper clamping assembly 16, with the exception, of course, that the screw in the lower member corresponding to the screw 22 in the upper member, tends to pull in a downward direction and the screws in the lower assembly 17 corresponding to the screws 23 and 24 in the upper assembly 16 tend to push upwardly.

The frame 1 is provided with sides 25 and 26 that surround the edge of the armature 6 and are bent tangentially thereto in order to effect a reduction in the size of the casing and also to strengthen the frame 1.

The bar magnets are of extended prismatic form and are free from any drill holes or any other reductions or weakness in the cross section, and can, therefore, be easily manufactured. The lower clamping members in the upper clamping structures, and the upper clamping members in the lower clamping structures are of a magnetic material and, comprise pole shoes for the cobalt steel bar magnets. The threaded screw means for securing the clamping structures to the frame, make possible a very easy regulation of the field strength between the pole shoes and secures the bar magnets so firmly to the frame structure that they will not be moved from their position by the magnetic pull that takes place between them.

The frame 1 and the clamping members are constructed in such a manner that the cobalt steel bar magnets are symmetrically disposed on both sides of the armature.

Figure 3:
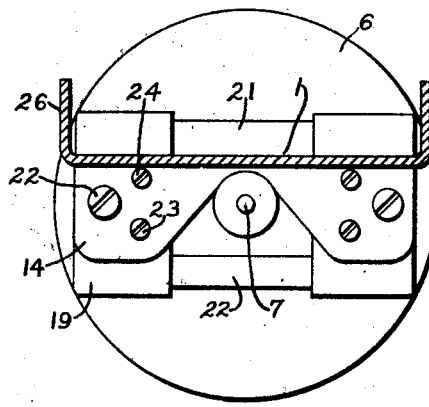
Fig. 3 is a view, in section, of the meter shown in Fig. 1, taken on the line III—III.
Figure 4:
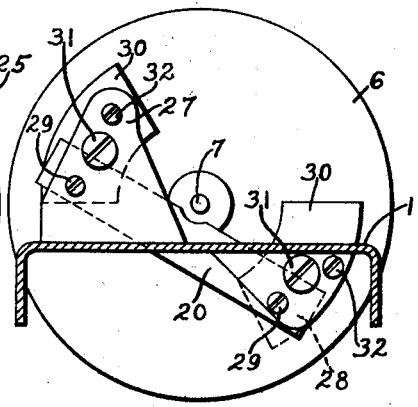
Fig. 4 is a view similar to Fig. 3 of a modification of my invention.

In a modification of my invention shown in Fig. 4, single bar magnets 20 are mounted on both sides of the armature 6 and are adapted to extend angularly to the plane of the frame 1. Frame 1 is provided with an inwardly extending projection 27 and an outwardly extending projection 28. The bar magnets 20 are secured directly to the projections 27 and 28 by means of the screws 29. The pole shoes 30 are secured to the projections 27 and 28 by the screws 31. The adjustable screws 32 are adapted to engage the surface of the pole shoes 30 in such manner that angular motion of the latter may be prevented. The pole shoes 30 shown in the modification are of an annular shape, although they may be of a rectangular shape as shown in Fig. 3.

A direct current ampere-hour meter constructed in accordance with my invention has all the desirable characteristics of neatness and compactness, and all the advantages to be gained by the usefulness of magnets made of steel having a high coercive force.

A meter constructed in accordance with my invention has also a distinct advantage, in that the essential operating parts of the meter may be readily and efficiently adjusted by the threaded screw clamping means that hold the cobalt magnets in position. The loss in manufacture caused by the cracking and bending of sections of cobalt steel is entirely eliminated because the sections are made in the simplest form or shape possible.

My invention may be variously modified without departing from the spirit thereof, and I desire to include all such modifications within the scope of the appended claims.

I claim as my invention:

1. The combination with the armature of a meter, of means for damping rotation thereof comprising a plurality of magnetized bars disposed symmetrically on opposite sides of said armature.

2. In combination, a disc armature, a plurality of bars of magnetized cobalt steel and means for adjustably mounting said bars in pairs on opposite sides of said disc.

3. The combination with the armature of a meter, of means for damping movement therein, comprising a plurality of unbent magnetized bars disposed on opposite sides of said armature.

In testimony whereof, I have hereunto subscribed my name this 27 day of April, 1927.

GEORG REIME.